(12) United States Patent
Hashimoto et al.

(10) Patent No.: US 9,902,390 B2
(45) Date of Patent: Feb. 27, 2018

(54) VEHICLE CONTROL DEVICE

(75) Inventors: Toshiya Hashimoto, Miyoshi (JP); Hideaki Yaguchi, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 14/361,002

(22) PCT Filed: Dec. 9, 2011

(86) PCT No.: PCT/JP2011/078589
§ 371 (c)(1),
(2), (4) Date: May 28, 2014

(87) PCT Pub. No.: WO2013/084358
PCT Pub. Date: Jun. 13, 2013

(65) Prior Publication Data
US 2014/0330472 A1 Nov. 6, 2014

(51) Int. Cl.
*B60W 10/184* (2012.01)
*B60K 6/445* (2007.10)
*B60W 10/06* (2006.01)
*B60W 10/08* (2006.01)
*B60W 30/18* (2012.01)
(Continued)

(52) U.S. Cl.
CPC .......... *B60W 10/184* (2013.01); *B60K 6/445* (2013.01); *B60W 10/06* (2013.01); *B60W 10/08* (2013.01); *B60W 20/50* (2013.01); *B60W 30/18127* (2013.01); *B60W 20/14* (2016.01); *B60W 2540/10* (2013.01); *B60W 2540/12* (2013.01);
(Continued)

(58) Field of Classification Search
CPC ............................ B60L 2210/30; B60W 10/30
USPC ........... 701/19, 22; 180/65.21, 65.31, 65.265
See application file for complete search history.

(56) References Cited

U.S. PATENT DOCUMENTS 5,905,349 A * 5/1999 Farkas ...................... B60L 7/18
318/139
6,278,916 B1 * 8/2001 Crombez .................. B60L 7/26
180/197
(Continued)

FOREIGN PATENT DOCUMENTS

DE 102011075131 A1 12/2011
EP 0983894 A2 3/2000
(Continued)

OTHER PUBLICATIONS

Bionx electric bike motor-generator specification, www.bionx.ca/en/technology/motor.html, Nov. 22, 2005.*

*Primary Examiner* — Michael McCullough
*Assistant Examiner* — Michael E Butler
(74) *Attorney, Agent, or Firm* — Sughrue Mion, PLLC (57) ABSTRACT

When the accelerator and the brake pedal are simultaneously depressed, braking occurs with drive force being produced. This increases the amount of heat produced by a friction braking device. Therefore, when the accelerator and the brake pedal are simultaneously depressed (S100: Yes), the range of use for a regenerative braking device is increased by expanding the regenerative braking limit (S101), thereby decreasing the range of use for the friction braking device, so that the produced heat to be suppressed. As a result, it is possible to simplify the friction braking device and eliminate the need to install a cooling mechanism equipped a high cooling performance.

9 Claims, 5 Drawing Sheets

(51) Int. Cl.
  *B60W 20/50*  (2016.01)
  *B60W 20/14*  (2016.01)
(52) U.S. Cl.
  CPC ........ *Y02T 10/6239* (2013.01); *Y02T 10/6286* (2013.01)

(56) References Cited

U.S. PATENT DOCUMENTS

| | | | |
|---|---|---|---|
| 9,126,501 B2* | 9/2015 | Ozaki | B60L 7/18 |
| 9,505,309 B2* | 11/2016 | Takabayashi | B60T 1/10 |
| 2005/0103551 A1* | 5/2005 | Matsuno | B60K 6/48 |
| | | | 180/243 |
| 2005/0151420 A1* | 7/2005 | Crombez | B60K 6/44 |
| | | | 303/152 |
| 2005/0284671 A1* | 12/2005 | Tatara | B60K 6/44 |
| | | | 180/24.06 |
| 2007/0038340 A1* | 2/2007 | Sekiguchi | B60L 3/10 |
| | | | 701/22 |
| 2007/0228821 A1* | 10/2007 | Maki | B60K 6/445 |
| | | | 303/152 |
| 2009/0118886 A1* | 5/2009 | Tamai | B60K 6/445 |
| | | | 701/22 |
| 2010/0036566 A1 | 2/2010 | Hayami | |
| 2010/0105520 A1* | 4/2010 | Ohbayashi | B60L 7/26 |
| | | | 477/23 |
| 2010/0198450 A1* | 8/2010 | Shin | B60W 30/16 |
| | | | 701/31.4 |
| 2010/0217491 A1* | 8/2010 | Naito | B60C 3/06 |
| | | | 701/49 |
| 2011/0082611 A1* | 4/2011 | Shiba | 701/22 |
| 2011/0202248 A1* | 8/2011 | Klausner | B60L 7/10 |
| | | | 701/70 |
| 2011/0295468 A1 | 12/2011 | Crombez et al. | |
| 2012/0138395 A1* | 6/2012 | Curtis | B60L 7/26 |
| | | | 188/159 |

FOREIGN PATENT DOCUMENTS

| | | |
|---|---|---|
| EP | 2110289 A2 | 10/2009 |
| JP | 2008-154324 A | 7/2008 |
| JP | 2010-038051 A | 2/2010 |

* cited by examiner

VEHICLE CONTROL DEVICE

CROSS REFERENCE TO RELATED APPLICATIONS

This is a National Stage of International Application No. PCT/JP2011/078589 filed Dec. 9, 2011, the contents of which are incorporated herein by reference in its entirety.

TECHNICAL FIELD

The present invention relates to a vehicle control device, which includes a friction brake device and a regenerative brake device.

BACKGROUND ART

There is a vehicle such as a hybrid vehicle and an electric vehicle that includes two types of brake devices, i.e., a friction brake device and a regenerative brake device. The friction brake device presses a brake shoe or a brake pad against a brake drum or a brake disk, which rotates together with a wheel, to convert kinetic energy caused by rotation of the wheel into thermal energy generated by friction thereof, thereby generating a braking force. The regenerative brake device causes an electric motor, which is usually used as a drive source, to operate as a generator. The regenerative brake device thus converts kinetic energy caused by rotation of the wheel into electric energy and collects the energy, thereby generating a braking force.

As a control system applied to a vehicle, there is known a brake override system as described in Patent Document 1, for example. According to the brake override system described in this document, when an accelerating operation (accelerator pedal is depressed) and a braking operation (brake pedal is depressed) are being simultaneously conducted, the throttle valve is narrowed down to lower the engine output, so that a higher priority is given to braking of the vehicle based on the braking operation than to acceleration of the vehicle based on the accelerating operation.

PRIOR ART DOCUMENT

Patent Document

Patent Document 1: Japanese Laid-Open Patent Publication No. 2010-038051

SUMMARY OF THE INVENTION

Problems that the Invention is to Solve

In a state where an accelerating operation and a braking operation are being simultaneously conducted, it is necessary to brake the vehicle against driving torque applied to the drive wheels, and the amount of heat generation of the friction brake is increased. Hence, if the state where the accelerating operation and the braking operation are being simultaneously conducted continues, the temperature of the friction brake device adversely rises. To avoid a temperature increase of the friction brake device, a cooling device having a high cooling performance is required for the friction brake device, and the configuration of the friction brake device will be complicated correspondingly. This problem is regarded important particularly in a vehicle employing a brake override system, which is designed based on the assumption that the accelerator pedal and the brake pedal can be simultaneously depressed.

An objective of the present invention is to provide a vehicle control device capable of simplifying a friction brake.

Means for Solving the Problems

To achieve the foregoing objective and in accordance with one aspect of the present invention, a vehicle control device is provided that includes a friction brake device and a regenerative brake device. When driver's accelerating operation and braking operation are being simultaneously conducted, a range of use of the regenerative brake device is expanded as compared with a case where the accelerating operation and the braking operation are not being simultaneously conducted.

According to this configuration, when the driver's accelerating operation and braking operation are simultaneously conducted, the range of use of the regenerative brake device is expanded, and the rate of share of the friction brake device in the entire braking force is reduced correspondingly. This suppresses a temperature increase of the friction brake device when a state where the driver's accelerating operation and braking operation are simultaneously conducted continues. Therefore, it is possible to simplify or remove a configuration of a cooling device provided in the friction brake device, so that the friction brake device will be simplified.

When the rate of share of the friction brake device in the entire braking force is made constant, the greater the drive force of the vehicle, the greater the amount of heat generation of the friction brake device becomes. Hence, to more reliably suppress a temperature increase of the friction brake device when the accelerating operation and the braking operation are simultaneously conducted, it is desirable to increase an expansion amount of the range of use of the regenerative braking operation as the drive force of the vehicle is increased.

If a state where the range of use of the regenerative brake device is expanded continues for a long period, the load of a battery, which stores electricity generated by the regenerative brake device, is increased. To avoid the increase in the load, it is preferable that the longer the period during which the accelerating operation and the braking operation are simultaneously conducted, the smaller the expansion amount of the range of use of the regenerative brake device becomes.

The higher the charging rate, voltage, temperature of the battery, or the higher the temperature of the electric motor, which functions as the regenerative brake device, the lower the tolerance against an increase in the load thereof caused by expansion of the range of use of the regenerative brake device becomes. Hence, when the charging rate and the voltage of the battery, which stores electricity generated by the regenerative brake device, the temperature, or the temperature of the generator, which functions as the regenerative brake device, are equal to or higher than the corresponding threshold value, it is desirable that the expansion amount of the range of use of the regenerative brake device is made smaller as compared with that in a case where the above factors are less than the threshold values.

If a vehicle employs a brake override system, which lowers the drive force of the vehicle and gives a higher priority, than acceleration of the vehicle based on an accelerating operation, to braking of the vehicle based on a braking operation when a driver's accelerating operation and the braking operation are simultaneously conducted, such a vehicle is designed based on assumption that the accelerating operation and the braking operation are simultaneously conducted. Hence, it is especially preferable that the vehicle control device of the present invention is applied to a vehicle that employs such a brake override system.

MODES FOR CARRYING OUT THE INVENTION

First Embodiment

A vehicle control device according to a first embodiment of the present invention will be described with reference to FIGS. 1 to 4. The control device of this embodiment is applied to a hybrid vehicle including two kinds of drive sources, i.e., an engine and a motor.

First, the configuration of the hybrid vehicle to which the control device of this embodiment is applied will be described.

Figure 1:
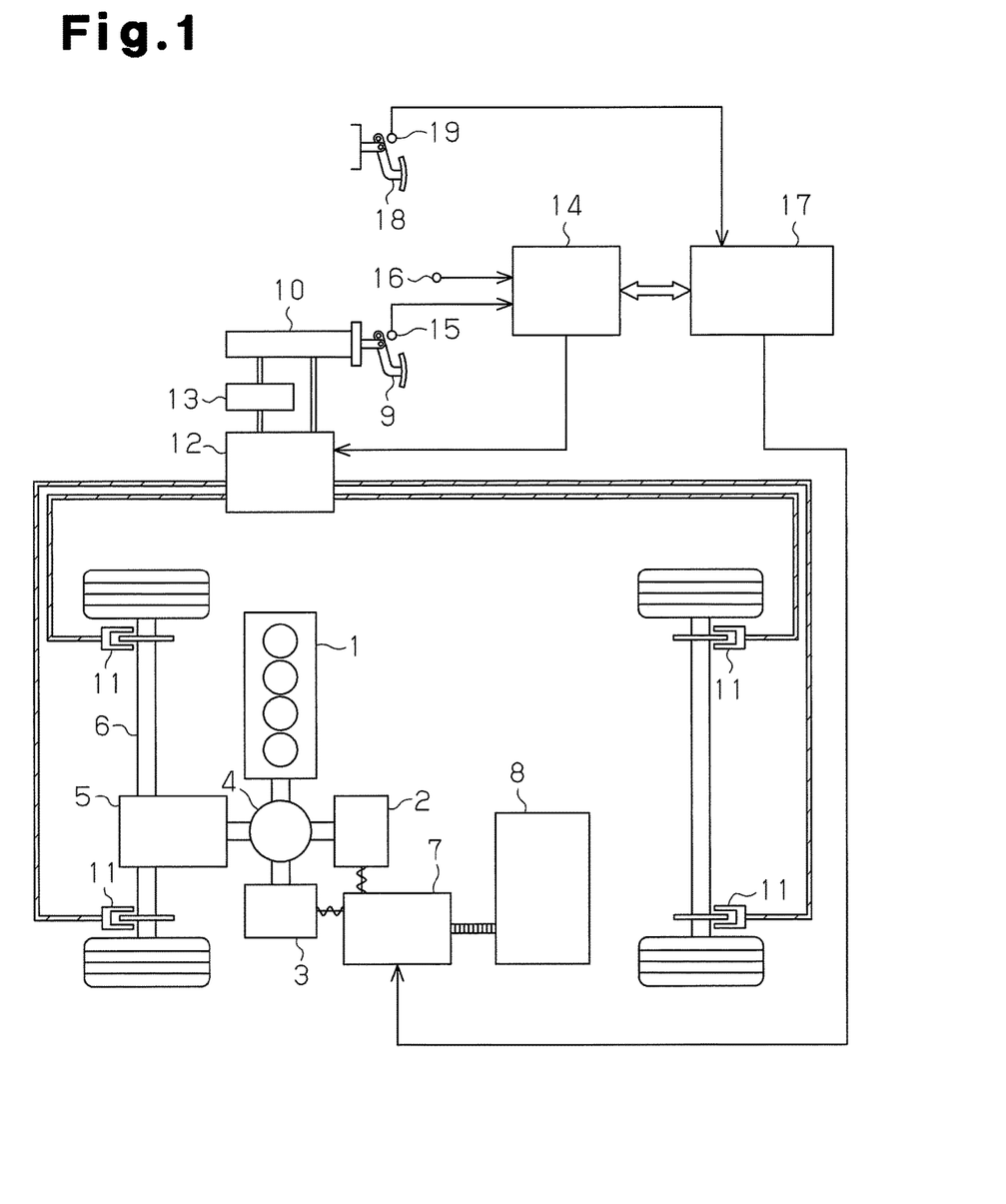
FIG. 1 is a schematic diagram showing the configuration of a hybrid system and an electronic control brake system of a hybrid vehicle to which a first embodiment of the present invention is applied.

As shown in FIG. 1, the hybrid vehicle includes a hybrid system as a drive source having an engine 1, which is a heat engine, and two motor generators. One of the two motor generators is mainly used for generating electricity, and the other one is used for generating drive force. In the following description, the motor generator mainly used for generating electricity will be referred to as a generator 2 and the motor generator mainly used for generating drive force will be referred to as a motor 3.

The hybrid system includes a power split mechanism 4, which is composed of a planetary gear mechanism. The engine 1, the generator 2, and the motor 3 are connected to the power split mechanism 4. The power split mechanism 4 is connected to drive wheels 6 through a speed reducing mechanism 5. The power split mechanism 4 splits power generated by the engine 1 into power for driving the generator 2 and power for driving the drive wheels 6.

Further, the hybrid system includes a power control unit 7. The power control unit 7 includes a boost converter and an inverter. The boost converter raises the voltage of a hybrid battery 8 to voltage that is required for driving the generator 2 and the motor 3. The inverter converts high-voltage direct current the voltage of which is raised by the boost converter into alternating current, which is supplied to the generator 2 and the motor 3. When the generator 2 and the motor 3 function as generators, the inverter converts alternating current generated by the generator 2 and the motor 3 into direct current.

The hybrid vehicle includes an electronic control brake system. The electronic control brake system includes hydraulic friction brake devices 11, which are provided for the respective wheels of the hybrid vehicle, and the motor 3, which generates electricity in a regenerative manner to function as a regenerative brake device. In accordance with driver's depressing motion of the brake pedal (braking operation member) 9, the electronic control brake system generates a braking force by the friction brake devices 11 and the motor 3, which generates electricity in a regenerative manner.

Next, the configuration of the electronic control brake system will be described.

The brake pedal 9 is connected to a master cylinder 10, which generates hydraulic pressure (master cylinder pressure) in accordance with the driver's depressing motion of the brake pedal 9. The master cylinder 10 is provided with a hydraulic booster, which assists a driver's depressing force of the brake pedal 9 and boosts the braking hydraulic pressure.

The master cylinder pressure generated by the master cylinder 10 is input to a brake actuator 12. The brake actuator 12 adjusts the master cylinder pressure and generates hydraulic pressure (braking hydraulic pressure) used for operating each of the friction brake devices 11.

The master cylinder pressure generated by the master cylinder 10 is also input to a stroke simulator 13. The stroke simulator 13 introduces the master cylinder pressure into a stroke simulator cylinder, which is incorporated in the stroke simulator 13, thereby generating natural pedal stroke that corresponds to the depressing force acting on the brake pedal 9.

The electronic control brake system includes a skid control computer 14 as a controller. Detection signals from sensors such as a brake pedal stroke sensor 15, which detects a depressing amount (braking operation amount) of the brake pedal 9, and a wheel speed sensor 16, which detects rotation speed (wheel speed) of each of the wheels are input to the skid control computer 14. The skid control computer 14 is connected, through an in-vehicle LAN, to a power management control computer 17, which controls the power control unit 7.

A detection signal from an accelerator pedal stroke sensor 19, which detects a depressing amount (accelerating operation amount) of an accelerator pedal (accelerating operation member) 18, is input to the power management control computer 17. The skid control computer 14 checks the accelerating operation amount through communication from the power management control computer 17.

Next, the outline of brake control of the hybrid vehicle in the electronic control brake system will be described. The brake control is conducted by the skid control computer 14.

When the brake pedal 9 is depressed, the skid control computer 14 calculates a required total braking force from a braking operation amount obtained from a detection signal of the brake pedal stroke sensor 15 and a vehicle speed obtained from a detection signal of the wheel speed sensor 16. The skid control computer 14 determines the ratio of share between the friction braking force of the friction brake devices 11 and the regenerative braking force of regenerative electricity generation of the motor 3 in accordance with the current traveling state of the hybrid vehicle. The skid control computer 14 then divides the required total braking force into the friction braking force and the regenerative braking force according to the ratio of share, thereby calculating a required friction braking force and a required regenerative braking force. A regenerative brake limit value calculated in accordance with the vehicle speed and the like is set for the regenerative braking force as an upper limit value. The required regenerative braking force is calculated to be equal to or less than the regenerative brake limit value. That is, the regenerative brake limit value determines the upper limit value of the braking force generated by the motor 3, which functions as the regenerative brake device by conducting regenerative electricity generation.

Next, the skid control computer 14 controls the brake actuator 12 such that a friction braking force that corresponds to the required friction braking force is obtained and adjusts brake hydraulic pressure to be supplied to the friction brake devices 11 of the respective wheels. The skid control computer 14 sends a required regenerative braking force to the power management control computer 17. The power management control computer 17 controls the power control unit 7 based on the received required regenerative braking force and makes the motor 3 conduct the regenerative electricity generation so that a regenerative braking force that corresponds to the required regenerative braking force is generated.

A brake override system (BOS) is employed in a hybrid vehicle that includes the electronic control brake system. When the driver simultaneously conducts an accelerating operation (accelerator pedal is depressed) and a braking operation (brake pedal 9 is depressed), the BOS reduces output of the hybrid system, thereby giving a higher priority to braking of the hybrid vehicle based on the braking operation than to acceleration of the hybrid vehicle based on the accelerating operation.

If such an operation of the BOS continues for a long time, the hybrid vehicle keeps braking in a state where the vehicle is traveling, heat is generated during that time, and the temperature of each friction brake device 11 adversely rises. Hence, in this embodiment, when the driver's accelerating operation and braking operation are simultaneously conducted, the range of use of the regenerative brake device (motor 3) is expanded as compared with a case where these accelerating operation and braking operation are not simultaneously conducted, thereby reducing the ratio of share of the friction brake device 11 in the entire braking force. This suppresses a temperature increase of the friction brake device 11.

Figure 2:
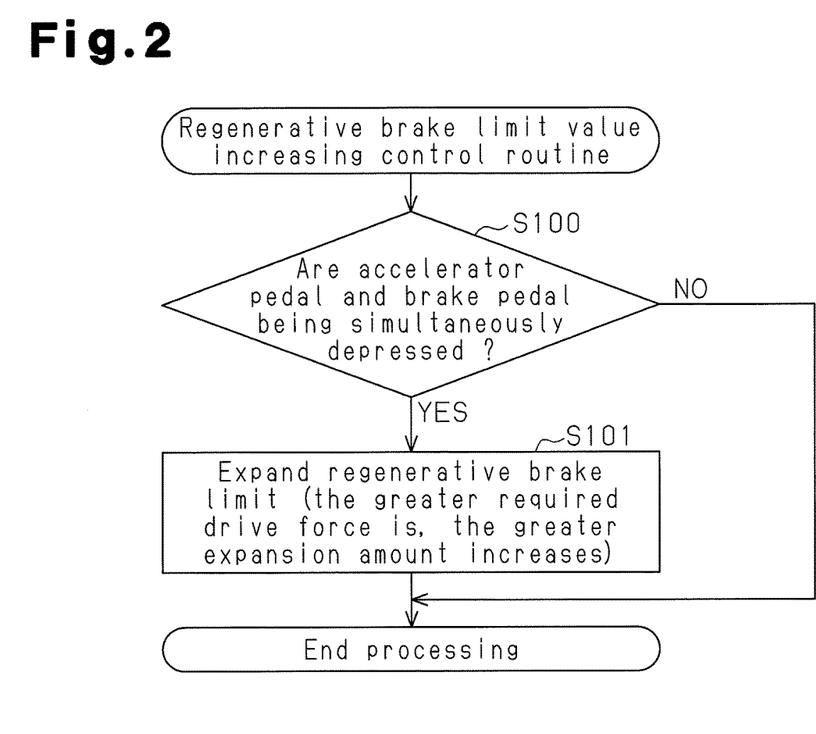
FIG. 2 is a flowchart showing processing procedure of a routine for controlling increase in the regenerative brake limit value, which is employed in this embodiment.

The control to suppress a temperature increase of the friction brake device 11 is conducted through processing of a routine for controlling an increase in the regenerative brake limit value shown in FIG. 2. When the hybrid vehicle is traveling, the processing of this routine is repeatedly executed by the skid control computer 14 at a prescribed control cycle.

If the processing of this routine is started, first, it is determined in step S100 whether the accelerator pedal 18 and the brake pedal 9 are being simultaneously depressed. If these pedals are not being simultaneously depressed (S100: NO), the processing of the current routine is ended as it is, and if these pedals are being simultaneously depressed (S100: YES), the processing goes to step S101.

When the processing goes to step S101, a regenerative brake limit is expanded in step S101, i.e., the regenerative brake limit value is increased, and the processing of the current routine is ended. This increases the upper limit value of the braking force to be generated by the motor 3, which functions as the regenerative brake device by conducting regenerative electricity generation.

Figure 3:
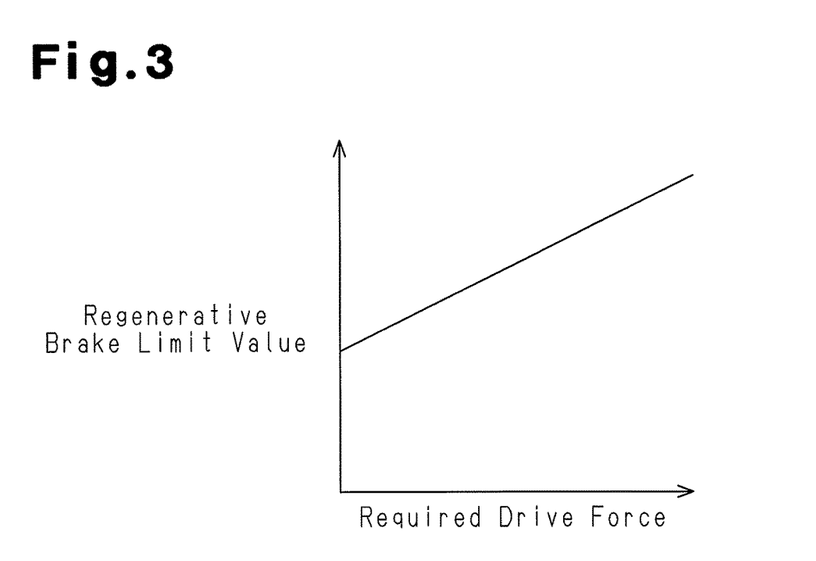
FIG. 3 is a graph showing a relationship between a regenerative brake limit value and a required drive force in this embodiment when an accelerator pedal and a brake pedal are being simultaneously depressed.

The regenerative brake limit at this time is expanded such that the greater the required drive force of the hybrid vehicle corresponding to the accelerating operation amount, the greater the expansion amount becomes. That is, as shown in FIG. 3, the greater the required drive force and the greater the drive force of the vehicle, the greater the regenerative brake limit value is set.

Next, a control operation when the brake is controlled in this embodiment will be described.

Figure 4A:
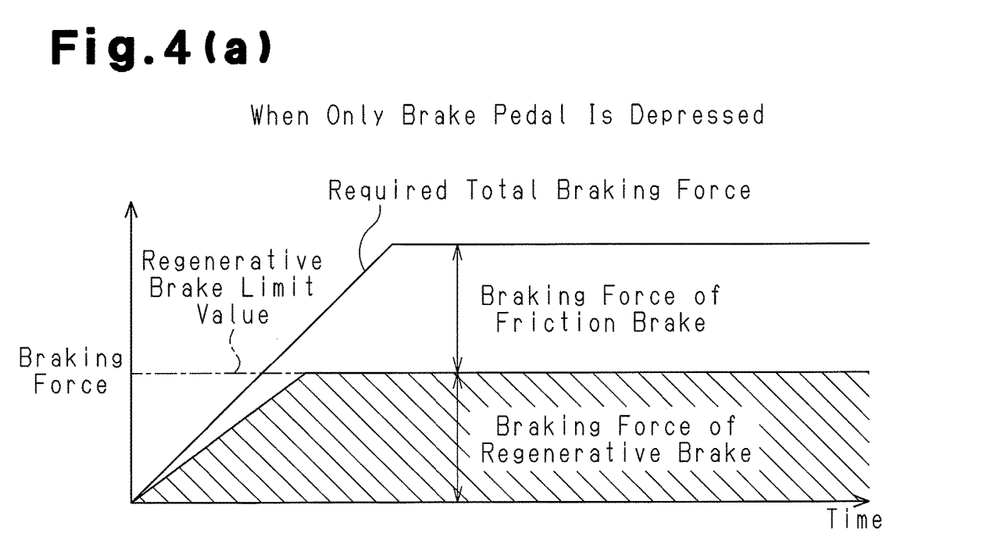
FIG. 4(a) is a time chart showing one example of brake control in this embodiment when only the brake pedal is depressed.

FIG. 4(*a*) shows a case in which the accelerator pedal 18 is not depressed and only the brake pedal 9 is depressed. In this case, for a while after depression of the brake pedal 9 is started, both a friction braking force of the friction brake device 11 and a regenerative braking force caused by regenerative electricity generation of the motor 3 are increased in accordance with increase in the required total braking force. However, if the regenerative braking force reaches the regenerative brake limit value, only the friction braking force is increased thereafter.

Figure 4B:
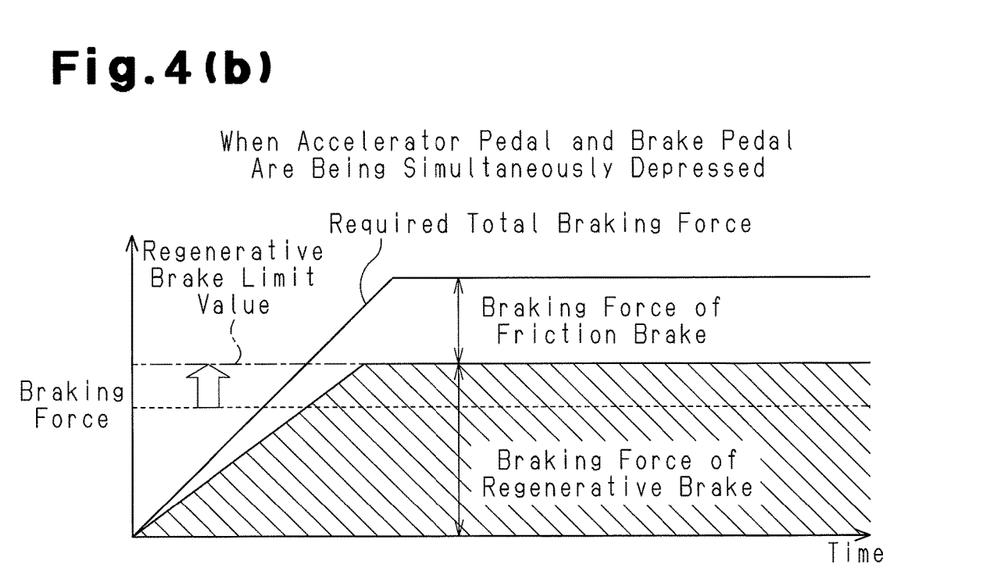
FIG. 4(b) is a time chart showing one example of brake control in this embodiment when the accelerator pedal and the brake pedal are being simultaneously depressed.

FIG. 4(*b*) shows a case in which the accelerator pedal 18 and the brake pedal 9 are being simultaneously depressed. In this case, since the regenerative brake limit value is increased, the regenerative braking force is increased to a greater value as compared with a case where only the brake pedal 9 is depressed. The friction braking force decreases correspondingly. Hence, heat generation of the friction brake devices 11 is suppressed, and a temperature increase is suppressed.

If the drive force of the hybrid vehicle during braking becomes great, the heat generation caused by friction at the friction brake devices 11 increases. In this regard, in this embodiment, the greater the required drive force, the greater the regenerative brake limit value is set and the smaller the friction braking force is set. Hence, also when the required drive force is great and the drive force of the hybrid vehicle is made great, a temperature increase of the friction brake devices 11 is reliably suppressed.

The present embodiment as described above has the following advantages.

(1) In this embodiment, when a driver's accelerating operation and braking operation are being simultaneously conducted, the regenerative brake limit value is made greater and the range of use of the regenerative brake device is expanded as compared with a case where the accelerating operation and the braking operation are not simultaneously conducted. If the range of use of the regenerative brake device is expanded, the rate of share of the friction brake device in the entire braking force is reduced correspondingly. Hence, it is possible to suppress a temperature increase of the friction brake device when a state where the driver's accelerating operation and braking operation are simultaneously conducted continues. Therefore, it is possible to simplify or remove the configuration of a cooling device provided in the friction brake device, and the friction brake device will be simplified.

(2) In this embodiment, the greater the drive force of the hybrid vehicle, the greater the expansion amount of the range of use of the regenerative brake device is set. Hence, even when the drive force is increased and the amount of heat generation of the friction brake device 11 becomes great, it is possible to reliably suppress a temperature increase of the friction brake device 11.

Second Embodiment

A vehicle control device according to a second embodiment of the present invention will now be described with reference to FIGS. 5 and 6. In the present embodiment and a third embodiment, which will be discussed below, like or the same reference numerals are given to those components that are like or the same as the corresponding components of the above described embodiment and detailed explanations are omitted.

In the first embodiment, when a driver's accelerating operation and braking operation are simultaneously conducted, the range of use of the regenerative brake device (motor 3) is expanded, thereby suppressing heat generation of the friction brake devices 11 and suppressing a temperature increase thereof. However, if a state where the range of use of the regenerative brake device is expanded continues for a long period, the load of the motor 3, which conducts regenerative electricity generation, and the load of the hybrid battery 8, which stores electricity generated by the motor 3, are increased. Hence, in this embodiment, when the period during which an accelerating operation and a braking operation are simultaneously conducted becomes long, the expansion amount of the range of use of the regenerative brake device is reduced to restrain these loads from increasing.

Figure 5:
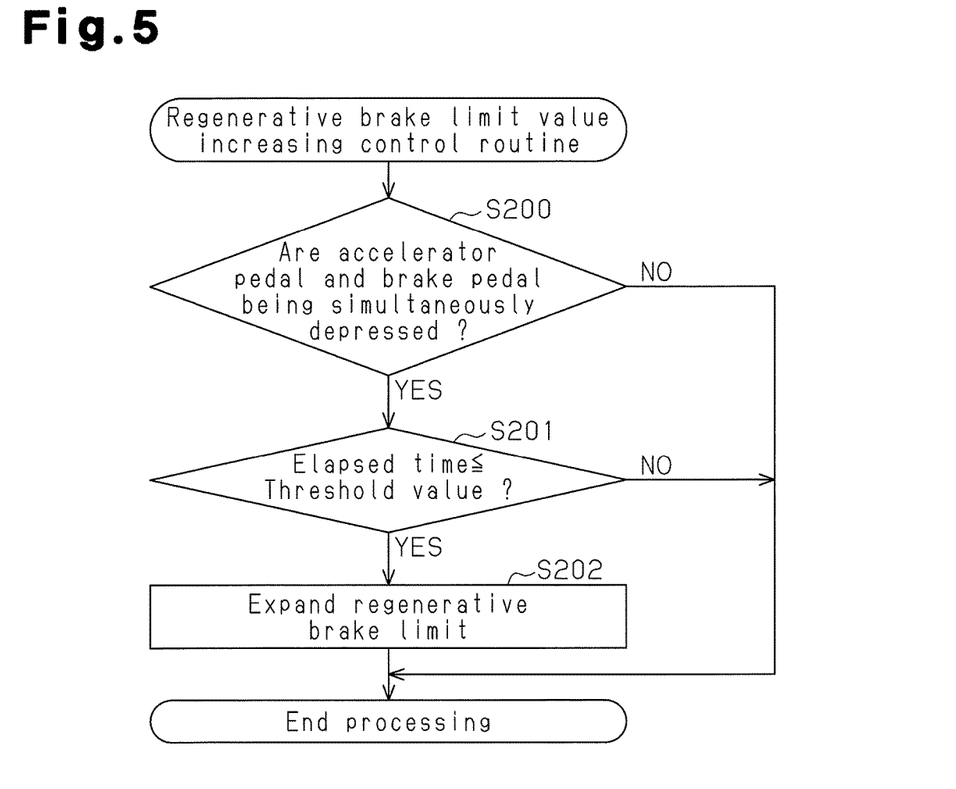
FIG. 5 is a flowchart showing processing procedure of a routine for controlling increase in the regenerative brake limit value, which is employed in a second embodiment of the present invention.

In this embodiment, the range of use of the regenerative brake device when the accelerator pedal 18 and the brake pedal 9 are being simultaneously depressed is expanded through processing of a routine for controlling increase in the regenerative brake limit value shown in FIG. 5. When the hybrid vehicle is traveling, the processing of this routine is repeatedly executed by the skid control computer 14 at a prescribed control cycle.

When the processing of this routine is started, first, it is determined in step S200 whether the accelerator pedal 18 and the brake pedal 9 are being simultaneously depressed. If these pedals are not being simultaneously depressed (S200: NO), the processing of the current routine is ended as it is, and if these pedals are being simultaneously depressed (S200: YES), the processing goes to step S201.

When the processing goes to step S201, it is determined in step S201 whether time elapsed from when the accelerator pedal 18 and the brake pedal 9 started being simultaneously depressed is equal to or less than a prescribed threshold value. This threshold value is a maximum value of time during which a state where the range of use of the regenerative brake device is expanded can be continued while keeping the increase in loads of the motor 3 and the hybrid battery 8 within a permissible range. If the elapsed time exceeds the threshold value (S201: NO), the processing of the current routine is ended as it is.

If the elapsed time is equal to or less than the threshold value on the other hand (S201: YES), the process goes to step S202. If the process goes to step S202, a regenerative brake limit is expanded in step S202, i.e., the regenerative brake limit value is increased, and the processing of the current routine is ended.

Next, a control operation of brake control in this embodiment when the accelerator pedal 18 and the brake pedal 9 are simultaneously depressed will be described.

Figure 6:
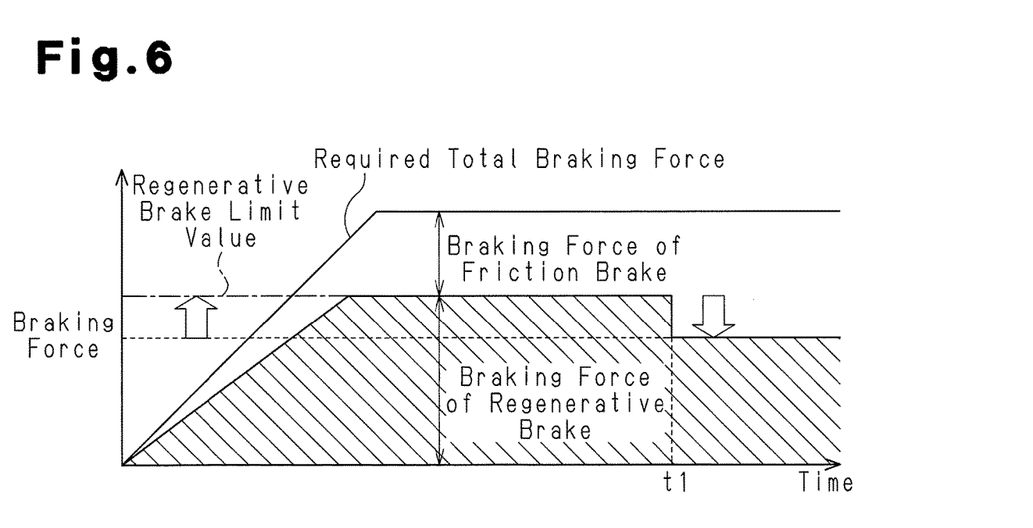
FIG. 6 is a time chart showing one example of brake control in this embodiment when an accelerator pedal and a brake pedal are being simultaneously depressed.

As shown in FIG. 6, the braking force of the regenerative brake device at this time is increased to a regenerative brake limit value, which is increased in accordance with increase in the required total braking force and in accordance with the simultaneous depressing operations of the accelerator pedal 18 and the brake pedal 9. However, if time elapsed from when the simultaneous depressing operations of the accelerator pedal 18 and the brake pedal 9 started reaches point in time t1, which is the threshold value, the increased regenerative brake limit value is returned to its original value. Hence, the braking force of the regenerative brake device is lowered, and the loads of the motor 3 and the hybrid battery 8 are suppressed.

The present embodiment has the following advantages in addition to the advantage (1).

(3) In this embodiment, when the period during which the accelerating operation and the braking operation are simultaneously conducted becomes long, the expansion amount of the range of use of the regenerative brake device is reduced. Hence, it is possible to reliably suppress the increase in loads of the motor 3 and the hybrid battery 8, which is caused by prolongation of the expansion of the range of use of the regenerative brake device.

Third Embodiment

A vehicle control device according to a third embodiment of the present invention will now be described with reference to FIG. 7.

If the charging rate and the voltage of the hybrid battery 8 are high and the temperatures of the hybrid battery 8 and the motor 3 are high, tolerance against the increase in the loads caused by expansion of the range of use of the regenerative brake device decreases since loads thereof are high right from the start. Hence, in such a case, expansion of the range of use of the regenerative brake device in accordance with the simultaneous depressing operations of the accelerator pedal 18 and the brake pedal 9 is not carried out in this embodiment.

Figure 7:
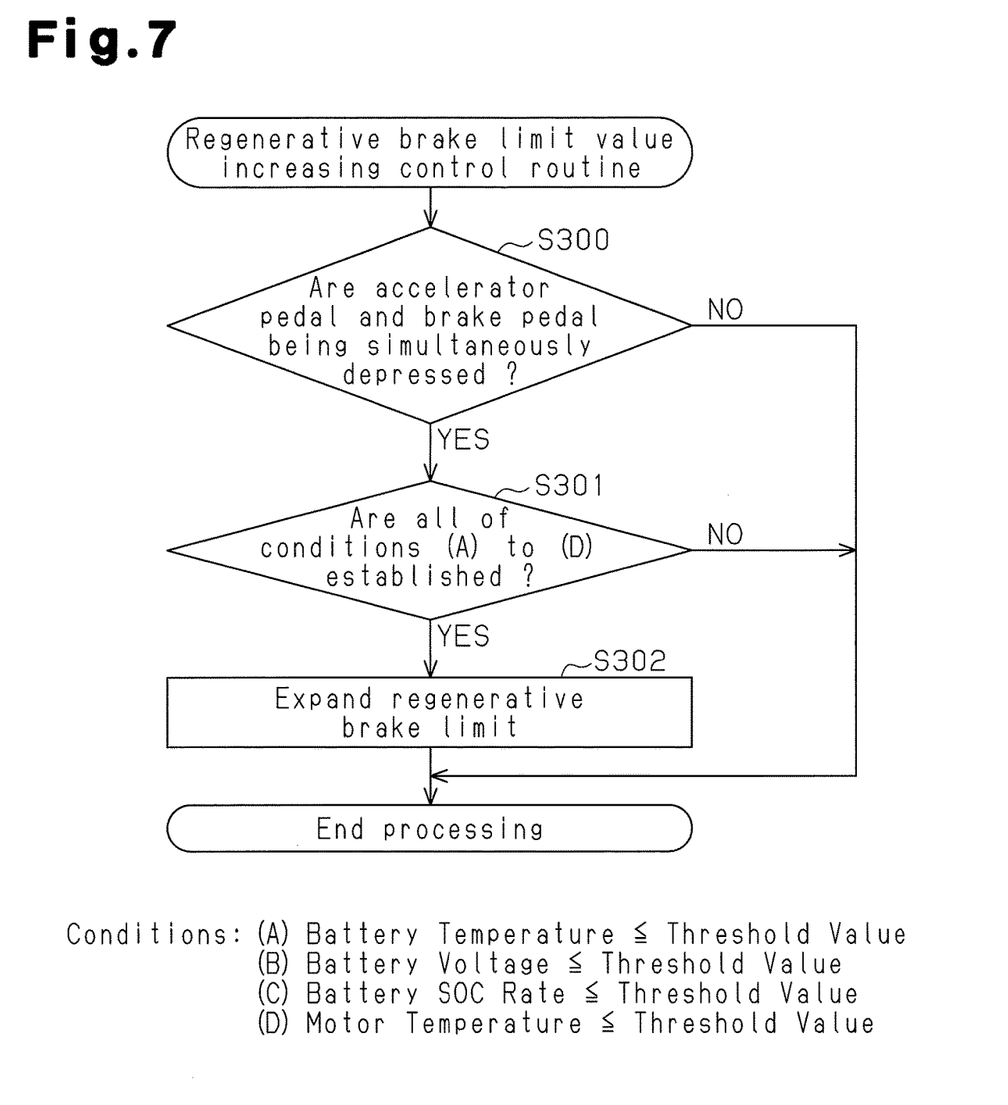
FIG. 7 is a flowchart showing processing procedure of a routine for controlling increase in the regenerative brake limit value, which is employed in a second embodiment of the present invention.

In this embodiment, the range of use of the regenerative brake device when the accelerator pedal 18 and the brake pedal 9 are being simultaneously depressed is expanded through processing of a routine for controlling increase in the regenerative brake limit value shown in FIG. 7. When the hybrid vehicle is traveling, the processing of this routine is repeatedly executed by the skid control computer 14 at a prescribed control cycle.

When the processing of this routine is started, first, it is determined in step S300 whether the accelerator pedal 18 and the brake pedal 9 are being simultaneously depressed. If these pedals are not being simultaneously depressed (S300: NO), the processing of the current routine is ended as it is, and if these pedals are being simultaneously depressed (S300: YES), the processing goes to step S301.

When the processing goes to step S301, it is determined whether all of the following conditions (A) to (D) are established.

(A) The temperature of the hybrid battery 8 is equal to or lower than a prescribed threshold value.

(B) The voltage of the hybrid battery 8 is equal to or lower than a prescribed threshold value.

(C) The charging rate (State of Charge: SOC) of the hybrid battery 8 is equal to or lower than a prescribed threshold value.

(D) The temperature of the motor 3 is equal to or lower than a prescribed threshold value.

If any one of the conditions (A) to (D) is not established (S301: NO), the processing of the current routine is ended as it is. If all of the conditions (A) to (D) are established on the other hand, the processing goes to step S302. When the processing goes to step S302, the regenerative brake limit is expanded in step S302, i.e., the regenerative brake limit value is increased, and the processing of the current routine is ended.

The present embodiment has the following advantages in addition to the advantage (1).

(4) In this embodiment, when the charging rate (SOC), the voltage and the temperature of the hybrid battery 8 and the temperature of the motor 3 are high, expansion of the range of use of the regenerative brake device in accordance with the simultaneous depressing operations of the accelerator pedal 18 and the brake pedal 9 is not carried out. Hence, it is possible to prevent loads of the hybrid battery 8 and the motor 3 from further increasing in a state where the loads thereof are high from the start.

The above described embodiments may be modified as follows.

In the first embodiment, the greater the drive force of the hybrid vehicle is, the greater the expansion amount of the range of use of the regenerative brake device is set. However, if the increase in the amount of heat generation of the friction brake device 11 caused by increase in the drive force of the hybrid vehicle is sufficiently small, the expansion amount of the range of use of the regenerative brake device may be set constant irrespective of the drive force of the hybrid vehicle.

In the second embodiment, if time elapsed after the simultaneous depressing operations of the accelerator pedal 18 and the brake pedal 9 are started becomes long, the expansion of the range of use of the regenerative brake device is canceled. However, it is not necessary to completely cancel the expansion, and it is possible to reliably suppress a temperature increase of the friction brake devices 11 by reducing the expansion amount.

In the second embodiment, the expansion amount of the range of use of the regenerative brake device is reduced only one time when time elapsed after the simultaneous depressing operations of the accelerator pedal 18 and the brake pedal 9 are started becomes equal to the threshold value. However, the expansion amount of the range of use of the regenerative brake device may be reduced gradually or in a stepwise manner in accordance with the elapsed time.

In the third embodiment, the range of use of the regenerative brake device is expanded in accordance with the simultaneous depressing operations of the accelerator pedal 18 and the brake pedal 9 only when all of the conditions (A) to (D) are established, but one or more of the conditions (A) to (D) may be omitted. For example, even in a case in which the temperature of the motor 3 is slightly high, if the motor 3 can sufficiently withstand the increase in the load caused by expansion of the range of use of the regenerative brake device, the condition (D) may be omitted, and the range of use of the regenerative brake device may be expanded in accordance with the simultaneous depressing operations of the accelerator pedal 18 and the brake pedal 9 in accordance with establishment of all of the conditions (A) to (C).

Since the amount of heat generation of the friction brake device 11 is varied depending upon magnitude of the friction braking force, the expansion amount of the range of use of the regenerative brake device in accordance with the simultaneous depressing operations of the accelerator pedal 18 and the brake pedal 9 may be varied in accordance with the magnitude of the friction braking force.

Since the amount of heat generation of the friction brake device 11 varies depending upon the vehicle speed, the expansion amount of the range of use of the regenerative brake device in accordance with the simultaneous depressing operations of the accelerator pedal 18 and the brake pedal 9 may be varied in accordance with the vehicle speed.

When the temperature of the friction brake devices 11 is high right from the start, the temperature of the friction brake devices 11 increases by the increase in the amount of heat generation caused by expansion of the range of use of the regenerative brake device. Therefore, the expansion amount of the range of use of the regenerative brake device in accordance with simultaneous depressing operations of the accelerator pedal 18 and the brake pedal 9 may be varied in accordance with the temperature of the friction brake devices 11. It is possible to directly detect the temperature of the friction brake devices 11. Alternately, the temperature can also be estimated from the temperature of brake oil, a previous use state of the friction brake devices 11, or the atmosphere temperature.

In the above embodiments, the range of use of the regenerative brake device is expanded by increasing the regenerative brake limit value, i.e., the upper limit value of the braking force (regenerative braking force) generated by the regenerative brake device. However, it is also possible to expand the range of use of the regenerative brake device by other means. For example, when time during which a state where the regenerative brake device generates a regenerative braking force continues is limited, it is also possible to expand the range of use of the regenerative brake device by moderating the limit of the time and by generating the regenerative brake device for longer time. In any of the cases, if the range of use of the regenerative brake device is expanded, the rate of share of the friction brake devices 11 in the entire braking force is reduced correspondingly, and a temperature increase of the friction brake devices 11 is suppressed.

Although the vehicle control device of the present invention is applied to the hybrid vehicle in the above embodiments, the vehicle control device of the invention may also be applied to a vehicle other than the hybrid vehicle in the same manner as or similar manner to that of the embodiments as long as the vehicle includes the friction brake device and the regenerative brake device.

In the above embodiments, the present invention is applied to the vehicle employing the brake override system, which lowers the drive force of the vehicle when a driver's accelerating operation and braking operation are simultaneously conducted. In this regard, even in a case of a vehicle that does not employ the brake override system, if a state where simultaneous depressing operations of the accelerating operation and the braking operation are simultaneously conducted continues for a long time, the temperature of the friction brake devices 11 rises. Hence, it is also effective to apply the control device of the present invention to the vehicle that does not employ the brake override system.

DESCRIPTION OF THE REFERENCE NUMERALS

1 . . . engine, 2 . . . generator, 3 . . . motor, 4 . . . power split mechanism, 5 . . . speed reducing mechanism, 6 . . . drive wheel, 7 . . . power control unit, 8 . . . hybrid battery, 9 . . . brake pedal, 10 . . . master cylinder, 11 . . . friction brake device, 12 . . . brake actuator, 13 . . . stroke simulator, 14 . . . skid control computer, 15 . . . brake pedal stroke sensor, 16 ... wheel speed sensor, 17 ... power management control computer, 18 ... accelerator pedal, 19 ... accelerator pedal stroke sensor

The invention claimed is:

1. A vehicle control device comprising:
a friction brake device configured to generate a friction braking force in response to driver's braking operation;
a regenerative brake device configured to generate regenerative braking force in response to the driver's braking operation; and
a computer configured to:
receive a signal from a brake sensor indicating an amount of the driver's braking operation;
receive a signal from an accelerator sensor indicating an amount of a driver's accelerating operation;
receive a signal from a wheel speed sensor indicating a vehicle speed;
determine whether the driver's accelerating operation and the driver's braking operation are being simultaneously conducted;
obtain a total required braking force based on the signal from the brake sensor and the signal of wheel speed sensor; and
control the friction brake device and the regenerative brake device,
wherein, based upon the computer determining that the driver's accelerating operation and the driver's braking operation are being simultaneously conducted, the computer is further configured to expand a range of use of the regenerative brake device to reduce a rate of share of the friction brake device in the total required braking force as compared with a case where the computer determines that only the braking operation is being conducted without the accelerating operation, and
wherein the computer is configured to increase an upper limit value of the regenerative braking force generated by the regenerative brake device or increase an upper limit value of a time period during which the regenerative brake device is continuously generating the regenerative braking force, in order to expand the range of use of the regenerative brake device.

2. The vehicle control device according to claim 1, wherein the computer is further configured to increase an expansion amount of the range of use of the regenerative brake device as a drive force of the vehicle increases.

3. The vehicle control device according to claim 1, wherein the computer is further configured to determine whether a period during which the accelerating operation and the braking operation are being simultaneously conducted exceeds a predetermined threshold of time, and the computer is configured to decrease the expansion amount of the range of use of the regenerative brake device upon the determination that the period during which the accelerating operation and the braking operation are being simultaneously conducted exceeds the predetermined threshold of time.

4. The vehicle control device according to claim 1, wherein the computer is further configured to: determine whether a charging rate of a battery, which stores electricity generated by the regenerative brake device, is equal to or more than a threshold value, and decrease an expansion amount of the range of use of the regenerative brake device when the charging rate of the battery is equal to or more than the threshold value as compared with when the charging rate of the battery is less than the threshold value.

5. The vehicle control device according to claim 1, wherein the computer is further configured to: determine whether a voltage of a battery, which stores electricity generated by the regenerative brake device, is equal to or more than a threshold value, and decrease an expansion amount of the range of use of the regenerative brake device when the voltage of the battery is equal to or more than the threshold value as compared with when the voltage of the battery is less than the threshold value.

6. The vehicle control device according to claim 1, wherein the computer is further configured to: determine whether a temperature of a battery, which stores electricity generated by the regenerative brake device, is equal to or more than a threshold value, and decrease an expansion amount of the range of use of the regenerative brake device when the temperature is equal to or more than the threshold value as compared with when the temperature of the battery is lower than the threshold value.

7. The vehicle control device according to claim 1, wherein
the regenerative brake device includes a generator, which carries out regenerative electricity generation, and
the computer is further configured to: determine whether a temperature of the generator is equal to or higher than a threshold value, and decrease an expansion amount of the range of use of the regenerative brake device when the temperature is equal to or higher than the threshold value as compared with when the temperature of the generator is lower than the threshold value.

8. The vehicle control device according to claim 1, wherein when the computer determines that the driver's accelerating operation and braking operation are being simultaneously conducted, the computer reduces output of a drive source of the vehicle.

9. A method for controlling a use of a friction brake device and a regenerative brake device of a vehicle, comprising:
generating a friction braking force by the friction brake device in response to a driver's braking operation;
generating a regenerative braking force by the regenerative brake device in response to the driver's braking operation;
receiving a signal from a brake sensor indicating an amount of the driver's braking operation;
receiving a signal from an accelerator sensor indicating an amount of a driver's accelerating operation;
receiving a signal from a wheel speed sensor indicating a vehicle speed;
determining whether the driver's accelerating operation and the driver's braking operation are being simultaneously conducted;
obtaining a total required braking force based on the signal from the brake sensor and the signal from the wheel speed sensor; and
controlling the friction brake device and the regenerative brake device, wherein, based upon the driver's accelerating operation and the driver's braking operation being simultaneously conducted, a range of use of the regenerative brake device is expanded by a computer in order to reduce a rate of share of the friction brake device in the total required braking force as compared with a case where only the braking operation is being conducted without the accelerating operation, and
increasing an upper limit value of the regenerative braking force generated by the regenerative brake device or increasing an upper limit value of a time period during which the regenerative brake device is continuously generating the regenerative braking force, in order to expand the range of use of the regenerative brake device.

\* \* \* \* \*